Patented Jan. 27, 1953

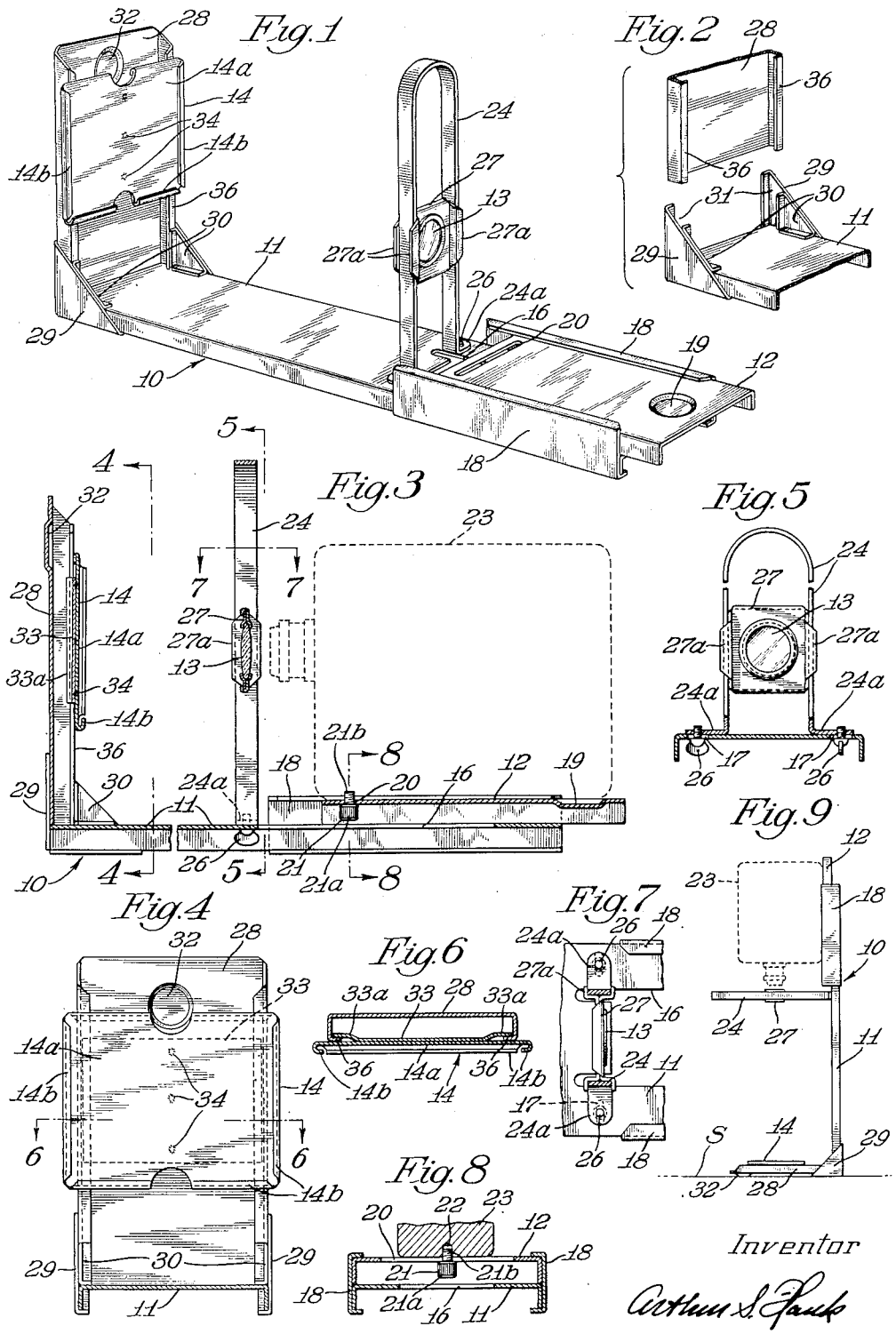

2,626,537

UNITED STATES PATENT OFFICE 2,626,537

MOVIE CAMERA TITLING APPARATUS

Arthur S. Flank, Chicago, Ill.

Application March 12, 1951, Serial No. 215,109

9 Claims. (Cl. 88—24)

1

This invention relates generally to accessories for amateur movie making equipment and more specifically relates to a titling apparatus for a movie camera which is universal in its adaptability to all known types of amateur movie cameras now commercially available.

According to the principles of the present invention, a titling apparatus made of stamped sheet metal components is provided. The apparatus comprises a breakdown assembly which is highly portable and which can be advantageously stored in a compact space. An elongated channel-shaped body member is provided, there being a camera support plate slidably supported at one end of the body member and a leg member removably connected thereto at the other end. A focusing lens is adjustably supported at an intermediate portion of the body member. A title positioner slidably carried by the leg member can, by selective adjustment of the positioner as well as of the lens and the support plate, be placed in coaxial alignment with the focusing lens and the lens of any conventional home movie camera.

A particular feature of the present invention resides in the advantageous construction of the support plate whereby adjustable connection means are provided to accommodate the assembly of various sizes and types of cameras furnished to the commercial market by different manufacturers.

Another important advantage of the present invention lies in the provision of a leg member which not only slidably supports the title positioner but, in addition, constitutes a pedestal to support the titling device in inverted position, thereby adapting the title positioner as a writing surface in the event an animated title or other spectacular titling effect is to be achieved.

It is an object of the present invention, therefore, to provide a titling apparatus made up of simplified, economically produced elements which will be generally available to amateur home movie producers at low selling cost but which will be sturdy in construction and durable in use.

Another object of the present invention is to provide a titling apparatus which will be universally applicable to all known types and sizes of commercially available movie cameras.

A further object of the present invention is to provide a titling apparatus which can be selectively positioned in horizontal or vertical positions during operation of the camera to facilitate the production of animated titles or other unusual titling effects.

2

Many other advantages, features and additional objects of the present invention will become manifest to those versed in the art upon making reference to the detailed description which follows and the accompanying sheet of drawings in which a preferred structural embodiment incorporating the principles of the present invention is shown by way of illustrative example.

On the drawings:

Figure 1 is an isometric view of a titling apparatus provided in accordance with the principles of the present invention;

Figure 2 is a fragmentary isometric view showing structural details of the connecting joint provided between the titler body and the leg member;

Figure 3 is a fragmentary cross-sectional view with parts shown in elevation and showing in dotted outline one specific type of camera which can be employed in connection with the structure of my invention;

Figure 4 is a cross-sectional view taken on line 4—4 of Figure 3;

Figure 5 is a cross-sectional view with parts broken out and with parts shown in elevation taken generally in the plane of line 5—5 of Figure 3;

Figure 6 is a cross-sectional view taken on line 6—6 of Figure 4;

Figure 7 is a cross-sectional view taken on line 7—7 of Figure 3;

Figure 8 is a cross sectional view taken on line 8—8 of Figure 3; and

Figure 9 is a reduced side elevational view showing how the titling apparatus may be invertedly positioned with the leg member constituting a pedestal to support the titling apparatus components during the production of an animated title or an unusual titling effect.

As shown on the drawings:

The titling apparatus of the present invention is indicated generally by the reference numeral 10 and comprises a body member 11 upon which a camera support plate 12, a lens 13 and a title positioner 14 are medially spaced along the major longitudinal axis thereof.

The body member 11 preferably comprises a sheet metal stamping of generally channel-shaped configuration, there being a web portion with opposed flanged legs extending the entire length thereof. As will be noted in Figures 1, 3, 5, 7 and 8, a portion of the web of the body member 11 is cut out as at 16 and there are also provided a pair of laterally spaced apart slots 17, the purpose of which will become manifest presently.

At one end of the body member 11, a pair of flanged side members 18 are firmly assembled to the legs of the body member 11, for example, by spot welding, the side members 18 together with the body member forming a trackway by means of which the camera support plate 12 is slidably retained for adjustable movement along the longitudinal axis of the body member 11.

The camera support plate 12 preferably comprises a sheet metal stamping of generally channel shaped configuration, the flanged legs of the plate 12 slidably engaging the side members 18 and being snugly embraced thereby. The web portion of the plate 12 is provided with a depressed boss 19 near one end thereof and with a transversely extending slot 20 near the other end thereof. The plate 12 is thus equipped to accommodate the support of any commercially available movie camera such as is commonly employed by home movie or amateur movie operators.

It will be noted upon making specific reference to Figures 3 and 8 that a camera attaching screw 21 having a knurled head 21a and a threaded stud 21b is arranged to have the stud 21b extend through the slot 20 and threadedly engage the complementally threaded tripod aperture 22 of a commercially available movie camera 23.

It will be readily appreciated that the camera 23 may be firmly assembled to the camera support plate 12 for sliding movement on the body member 11 despite the relative lateral positioning of the tripod aperture 22 and despite the contour configuration of the camera 23. Moreover, the plate 12 being provided with the slot 20, the camera 23 may be selectively positioned laterally with respect to the plate 12 and locked in selected position by turning up the screw 21.

It is further possible to angularly position the camera 23 in adjusted alignment relative to the plate 12, the screw 21 serving as an adjustable pivot for the camera 23.

To support the lens 13, I have provided a U-shaped track 24 which preferably takes the form of a strip of metal bent back upon itself to form two spaced apart legs with turned out toe portions 24a at the ends thereof. The toe portions 24a are adapted to engagingly abut the web portion of the body member 11 in the locale of the slots 17 so that a pair of winged screws 26 with their threaded portions extending through the slots 17 will threadedly engage complementally threaded apertures formed in the toe portions 24a. Because the length of the slots 17 extend laterally of the longitudinal axis of the body member 11, limited adjustability of the U-shaped track 24 is facilitated and the track 24 may be locked in firm assembly with the body member 11 by turning up the screws 26.

The lens 13 is retained in a holder 27 comprising a sheet metal element formed with opposed channel-shaped legs 27a which embrace a substantial portion of the opposed legs of the U-shaped track 24 in slidable engagement. A wide range of adjustability is thereby provided for the lens 13, the retainer 27 being slidable along a vertical axis, the limits of which being prescribed by the U-shaped track 24.

At the end of the body member 11 is provided channeling means to insertably receive an upstanding leg member 28. In this particular embodiment, the channeling means comprises spaced apart pairs of mating angle clips, each pair of angle clips including a generally triangularly-shaped sheet metal member 29 flanged on two legs to form a right angle recess and a similarly shaped member 30 somewhat smaller in size but similarly flanged. By assembling the members 29 and 30 on the end of the body member 11, a pair of aligned channels 31 (Figure 2) is provided to receive in sliding assembled relationship the leg member 28.

The leg member 28 is of generally channel-shape configuration, the opposed flange legs of the leg member 28 being constructed to be snugly received in each of the channels 31 in slidably assembled relationship with the body member 11. It should be particularly noted that the leg member 28 is provided with a depressed boss portion 32 near the free end thereof. The leg member 28 is thus adapted to constitute a pedestal if the titler apparatus 10 is to be used in a vertical position as shown in Figure 9.

In Figure 9, a supporting surface is depicted by the reference character S and the depressed boss portion 32 together with the members 29 engage the supporting surface S to permit the leg member 28 to act as a pedestal for the titler apparatus 10.

In using the titler apparatus 10 in a vertical position, it is a simple matter to make animated titles. While the camera 23 is operating, a title may be written on a suitable medium carried by the title positioner 14 because a flat writing surface is presented to the operator. It is also possible to add letters or shift pictures or other articles into the camera view to produce an animated title or other spectacular titling effect. For example, it is possible to photograph maps adding a touch of action with the aid of a cutout arrow which may be progressively pushed along the route followed across the map area.

The title positioner 14 comprises a generally rectangular piece of sheet metal forming a body portion 14a and having turned-over flange portion 14b to provide suitable supporting means for a title card or the like.

A slide clip 33 (Figure 6) having offset end portions 33a is spot welded to the body portion 14a of the title positioner 14 as at 34 and the offset end portion 33a, together with the body portion 14a, form a trackway recess to receive turned-over finger portions 36 formed on the opposed flange legs of the leg member 28. Thus, the title positioner 14 may be adjustably positioned along the length of the leg member 28 merely by sliding the title positioner 14.

In operation, the titler apparatus 10 is adaptable for use will all commercially available 8 mm. and 16 mm. model cameras. To set the apparatus 10 up for operation, the U-shaped trackway 24 is fastened in place with the thumb screws and the leg member 28 is mounted on the body member by inserting into the channels 31. The camera 23 is then placed on the sliding camera support plate 12 and arranged so that the camera lens is generally aligned relative to the U-shaped trackway 24. The camera 23 may be locked in position by turning the thumb screw 20 into the tripod aperture 22 of the camera. The focusing lens 13 is then raised or lowered selectively until it is aligned with the lens of the camera 23.

Since the camera support plate 12 is readily removable from the body member 11, the support plate 12 and the camera 23 may be slidably removed and temporarily positioned between the leg member 28 and the focusing lens 13. The titler positioner 14 is then selectively raised or lowered on the leg member 28 until the lens is centered with respect thereto.

The camera 23 and the camera support plate 12 may then be returned to its initial position by sliding the support plate into the trackway provided by the side members 18.

The title positioner 14, the lens 13 and the lens on the camera 23 being coaxially aligned, the titling apparatus is ready for use.

Although a person skilled in the art might suggest various minor structural modifications to the structure herein provided by way of illustrative examples of the principles of my invention, it should be understood that I wish to embrace within this patent all such modifications as reasonably and properly come within the scope of my contribution to the art.

I claim as my invention:

1. A portable breakdown titling device for a movie camera comprising an elongated body member, camera support means slidably mounted on one end of said body for adjustable movement along the longitudinal axis thereof, a focusing lens means carried by said body member at an intermediate portion thereof to adjustably support said lens for movement relative to said body member, a leg member, support means at the other end of said body member, said support means having channeling elements to insertably receive said leg member in firm assembly with said body member, and title positioning means slidably supported by said leg member for adjustable movement along an axis normal to said body member axis, said leg member having a boss portion forming together with said support means a pedestal base for said leg member whereby said titling device may be selectively employed vertically and horizontally.

2. In a movie camera titling device of the type having a camera support, a focusing lens and a title positioner at one end of a body member, the improvement of a body member having support members including channeling elements, a leg insertably received by said channeling elements in firm assembly with said body member, a title positioner slidably carried by said leg and a boss portion formed on said leg, said boss portion and said support members adapted to be concurrently engageable with a supporting surface, said leg constituting a pedestal when said titling device is positioned vertically.

3. In a titling device for a movie camera, the improvement whereby a universally adaptable titling structure is provided to accommodate cameras of varying size comprising a stamped sheet metal body member of generally channel-shaped configuration, flange means at one end of said body member forming together therewith a pair of opposed trackways, a stamped sheet metal generally channel-shaped camera support plate slidably received in said trackways for adjustable movement along the axis of said body member, a transverse slot in said plate arranged to be normal to the axis of said body member, screw means adapted to threadedly engage the tripod amount of a camera and extending through said slot, whereby a camera may be adjustably positioned relative to said body member along rectangular coordinate axes including the longitudinal axis of said body member and the transverse axis of said slot, a U-shaped metal strip having toe members on the ends thereof, a pair of spaced slots in an intermediate portion of said body member, screw means extending through each of said pair of spaced slots and engageable with said toe members to secure said metal strips in adjusted firm assembly with said body member, a lens holder having a lens therein and including opposed U-shaped channel means slidably engageable with the opposite legs of said U-shaped strip, said lens holder being adjustably positionable relative to said body member on a plane generally normal thereto, flanged sheet metal angle clips at the other end of said body member forming together with one another a pair of laterally spaced apart channels, a stamped sheet metal generally channel-shaped leg member insertably receivable in said channels and positioned thereby in firm assembly with and generally normal to said body member and a title positioner slidably carried by said leg member for movement toward and away from said body member, said title positioner and said lens being adapted to be adjustably positioned in coaxial alignment with the lens of a camera carried by said camera support plate.

4. In a movie camera a titling device of the type having a camera support plate, a focusing lens and a title positioner medially spaced along the length of a common support member and a title positioner at one end of said support member, the improvement whereby animated titles may be photographed which improvement comprises a leg member adapted to be connected at one end of the common support member, said leg member providing track means adapted to slidably support the title positioner, said leg member constituting a pedestal engageable with a supporting surface to support said titling device in a vertical position and adapted to support said title positioner as a writing surface directly adjacent the supporting surface, and said title positioner being adjustable transversely of said pedestal while in the vertical position.

5. In a titling apparatus, a body member, a title positioner movably mounted on one end of said body member and adjustably positionable relative thereto, a lens bracket on said body member spaced from said title positioner, a lens movably mounted in said bracket and adjustably positionable relative to said body member, said body member having opposed trackways formed on the other end thereof and a camera support plate slidably receivable in said trackways, said support plate being adjustably positionable along the longitudinal axis of said body member, said support plate having a transverse slot formed therein and a thumb screw to extend through said slot for engagement with a camera to be supported on said support plate, said support plate together with a camera mounted thereon being selectively removable from said body member for use in aligning said title positioner with said lens.

6. In a titling apparatus of the type having a base member with a title supporting means and an auxiliary lens supported in spaced relationship on the base member, the improvement of means adapted to be slidably connected to the base member adjacent the auxiliary lens and a camera support member slidably receivable by said slide means, said support member being slidable towards and away from said lens and means to mount a camera on said support member, said means including a transversely arranged slot in said support member adapted to be positioned in registry with the support socket of a movie camera and screw means adapted to lock the camera on said support member in selected transverse alignment relative thereto, said support member being selectively removable from said slide means.

7. A titling apparatus comprising a sheet metal channel-shaped base member, a pair of flanged members on one end of said base member and together therewith forming a slide track, a sheet metal channel-shaped camera support member insertable and slidable in said slide track for adjustable assembly with said base member, said support member including means to connect a camera thereto, a bracket on said base member at an intermediate portion thereof, a lens holder slidably mounted on said bracket and adjustable relative to said base member, a lens in said holder adapted to be vertically aligned with the lens of a camera mounted on said support member, a leg member on the other end of said base member, and a title positioner slidably carried by said leg member for adjustment relative to said base member, said title positioner adapted to be vertically aligned with said lens.

8. In a titling apparatus for movie cameras, a base member, track defining means on one end of said base member, a camera support plate slidable in said track defining means for adjustment along the length of said base member, easel means for mounting a title on said base member in longitudinal alignment with said plate, said easel means including adjustable support elements adapted to position a title in vertical alignment with the lens of a camera mounted on the camera support plate, and an auxiliary lens mechanism on said base member between said easel means and said plate also in longitudinal alignment with said plate and with said easel means, said mechanism including a bracket defining a slide track, a lens holder slidably mounted on said slide track and a lens in said holder adapted to be vertically aligned with the title and the lens of the camera.

9. A titling apparatus as in claim 8, said camera supporting plate having a transverse slot therein through which a camera attaching screw can be mounted for horizontal adjustment.

ARTHUR S. FLANK.

REFERENCES CITED

The following references are of record in the file of this patent:

UNITED STATES PATENTS

| Number | Name | Date |
| --- | --- | --- |
| 835,623 | Kinney | Nov. 13, 1906 |
| 1,787,198 | Howell | Dec. 30, 1930 |
| 2,168,688 | Simms | Aug. 8, 1939 |
| 2,235,355 | Brown | Mar. 18, 1946 |

FOREIGN PATENTS

| Number | Country | Date |
| --- | --- | --- |
| 878,570 | France | Oct. 19, 1942 |